Jan. 1, 1929.                                        1,697,809
F. L. CHERRY
HAM HOLDER
Filed Nov. 30, 1925
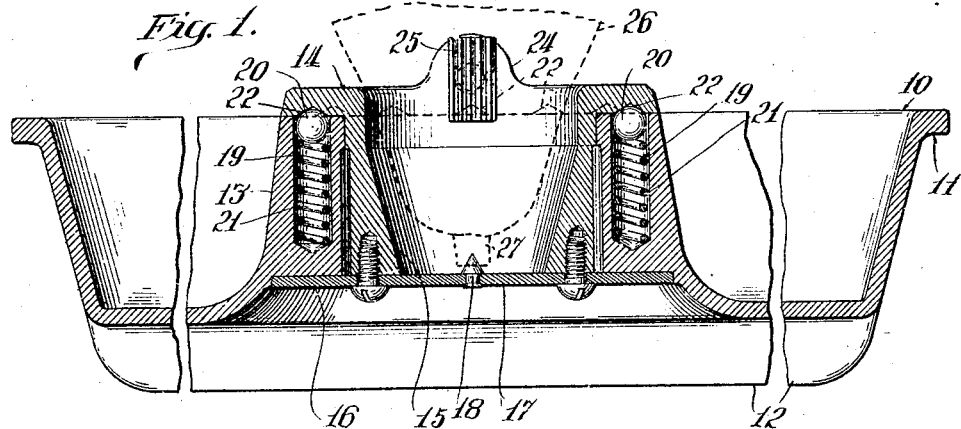
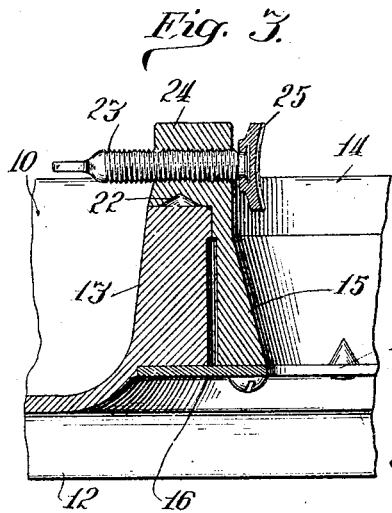
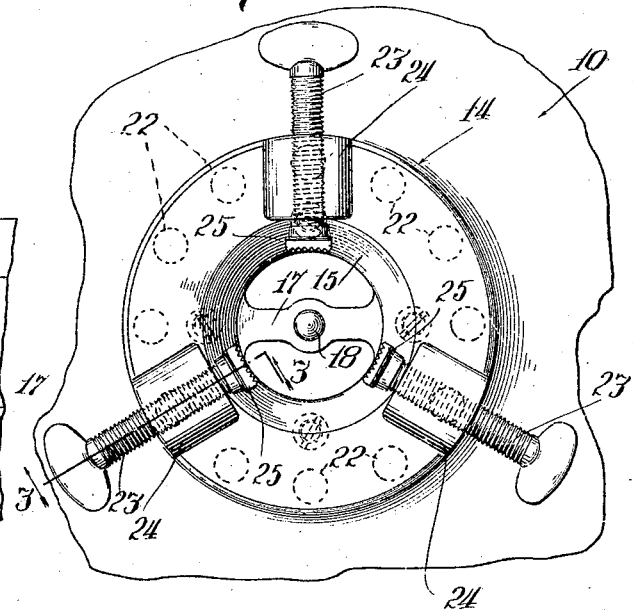
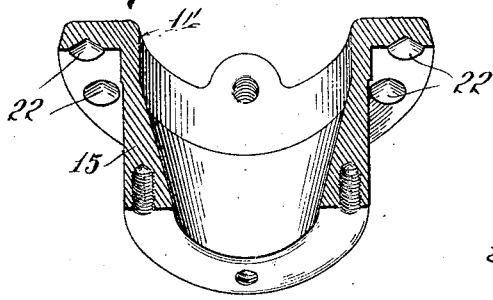
Inventor
Frank L. Cherry
By Leslie W. Frick
Attorney Patented Jan. 1, 1929.

1,697,809

UNITED STATES PATENT OFFICE.

FRANK L. CHERRY, OF CHICAGO, ILLINOIS, ASSIGNOR TO LESLIE W. FRICKE, OF OAK PARK, ILLINOIS.

HAM HOLDER.

Application filed November 30, 1925. Serial No. 72,084.

My invention relates to means for holding cooked hams or other pieces of meat firmly and adjustably in position for slicing so as to make possible the cutting of the meat evenly into large, thin slices such as are desired for serving. It is one of the objects of my invention to provide a device of this type by the use of which the pieces of meat shall be held in position with sufficient firmness for a cutting operation, and which at the same time is very easily adjustable in either direction at the will of the operator for enabling ready access to the piece of meat from a different angle. It is another object of my invention to provide meat holding means of this type adapted for use in connection with the ordinary warming pan as employed on a steam table.

It is another object of my invention to improve devices of this type in sundry details hereinafter pointed out. The preferred means by which I have accomplished my several objects are illustrated in the drawing and are hereinafter specifically described. That which I believe to be new and desire to cover by this application is set forth in the claims.

In the drawing—

Fig. 1 is a central vertical section through a receptacle of the warming pan type provided with my improved meat holding means, being broken away at two points for clearness of illustration;

Fig. 2 is a top plan view of the meat holding means at the middle of the pan;

Fig. 3 is a vertical cross section taken substantially at line 3—3 of Fig. 2; and Fig. 4 is a perspective view of the turn table member, shown partly in section.

Referring to the several figures of the drawing,—10 indicates a receptacle of the warming pan type adapted to be held in position upon a steam table by an outwardly extending flange 11. Upon its bottom face the pan is reinforced by cross flanges 12, preferably formed integrally with the pan.

At its middle point, the pan 10 is provided with an upwardly projecting sleeve 13 which is preferably formed integrally with the pan. Revolubly mounted upon the sleeve 13 there is a turn-table 14 comprising a downwardly extending sleeve 15, the sleeve 15 at its upper end portion having a working fit in the upper end of the sleeve 13. Upon the lower end of the sleeve 15, I have provided a plate 16 in the form of a ring and comprising a cross bar 17 which is provided at its middle point with an upwardly extending pin 18. The ring 16 is releasably secured in position, serving to hold the turn-table 14 in position upon the pan and serving by its contact with the lower end of the sleeve 13 to act as a brake with respect to the rotation of the turn-table.

As is best shown in Fig. 1, the sleeve 13 of the pan or base member is provided with a plurality of recesses 19 in spaced relation thereabout, in the upper end of each of which is mounted a plunger 20, such plungers in the construction shown being in the form of balls. In each recess 19 below the ball 20 there is mounted a coiled spring 21 which serves to press the ball upwardly into engagement with one or another of the sockets 22 formed on the bottom face of the turn-table 14. The sockets 22 are arranged so as to come into alignment with the recesses 19 periodically during the rotation of the turn-table, the arrangement as illustrated being such that a socket 22 is in alignment with each of the recesses 19 at the same point in the rotation of the turn-table with respect to the pan.

By this arrangement the spring pressed balls or plungers 20 serve to hold the turn-table quite firmly from rotation, while at the same time being releasable by a cam or wedge action against the force of the springs for permitting rotation of the turn-table upon the application of a fairly moderate pressure to the turn-table for rotating it. The strength of the springs 21 is such that the turn-table will be held with sufficient firmness for preventing rotation of the turn-table under any ordinary conditions incident to the slicing of the meat as hereinafter described. The turn-table can, however, be rotated in either direction whenever desired by the operator.

The means for holding a ham or other piece of meat in position upon the turn-table comprises, in the construction shown, three wing bolts 23 which are connected by means of screw threads with the turn-table 14, the turn-table being provided with upward extensions 24 thereon for reception of such bolts. Upon the inner ends of the bolts 23, I have provided serrated clamping plates 25 of any approved type which are adapted by engagement with the sides of a piece of meat to clamp it firmly in position on the turn-table above the bottom of the pan 10.

When a piece of meat such as the ham 26 as shown in dotted lines in Fig. 1 is to be secured in position upon the turn-table, the bone 27 of such ham is placed in position upon the pin 18 and the clamping plates 25 are brought to bear firmly against the sides of the bone or against the sides of the piece of meat so as to hold it rigidly in position with respect to the turn-table.

With a piece of meat held rigidly in position above the turn-table 14, an operator can to the best possible advantage trim or slice the meat as he may desire. Whenever he desires to turn the piece of meat in the pan, he can do so by applying a moderate amount of pressure upon the turntable or upon the piece of meat as above described.

While I prefer to employ the construction as illustrated in the drawing and as above described, it will be understood that I do not desire to be limited to the form of construction as shown except so far as the same may be specifically claimed, since it is evident that changes may well be made in the form of construction without departing from the spirit of my invention.

I claim:

1. A meat holding device comprising a base, a turn-table mounted thereon, means carried by said turn-table for supporting a piece of meat in fixed position thereon, and releasable means for holding said turn-table adjustably in position on said base but retracted by a camming action upon rotation of the turn-table in either direction by the application of a slight force thereto.

2. A meat holding device, comprising a base, a turn-table mounted thereon, means carried by said turn-table for supporting a piece of meat in fixed position thereon, and a plurality of releasable holding members arranged in spaced relation about the base adapted to cooperate for holding the turn-table adjustably in position thereon, being withdrawn from holding engagement with the turn-table by rotation of the turn-table in either direction upon the application of a slight force thereto.

3. A meat holding device, comprising a base member, a rotatable member mounted on said base member, spring pressed plunger means carried by one of said members in position to engage any of a plurality of sockets in the other member for holding the rotatable member adjustably in position, and means carried by the rotatable member for supporting a piece of meat in fixed position thereon.

4. A meat holding device, comprising a base member, a rotatable member mounted on said base member, a plurality of plungers mounted in upwardly opening recesses arranged in spaced relation about said base, a plurality of springs in said recesses respectively tending to force said plungers out of the recesses into engagement with correspondingly positioned downwardly opening sockets in said rotatable member for holding the rotatable member releasably against rotation on the base member, and means carried by the rotatable member for supporting a piece of meat in fixed position thereon.

5. In a meat holding device, the combination of a base comprising a vertically extending sleeve, a turn-table provided with a downwardly extending sleeve journalled in the sleeve of said base, a retaining member releasably carried by the turn-table adapted to hold the turn-table in position on the base and adapted by frictional engagement with the base to act as a brake with respect to rotation of the turn-table, a plurality of balls mounted in upwardly opening recesses arranged in spaced relation about said base, a plurality of springs mounted in said recesses respectively tending to force said balls out of said recesses into engagement with sockets formed in said turn-table in spaced relation about said downwardly extending sleeve for holding the turn-table releasably against rotation on the base, and means carried by the turn-table for supporting a piece of meat in fixed position thereon.

6. A meat holding device, comprising in combination a pan having an opening through the bottom, a flange rising from the bottom of the pan about said opening, an upwardly projecting pin supported in said opening, and adjustable clamping devices in spaced relation to each other about said pin and at a higher level for holding a piece of meat in position on the pin.

7. A meat holding device, comprising in combination a pan having an opening through the bottom, a flange in the form of a ring rising from the bottom of the pan about said opening, a turn-table revolubly mounted in said ring, means carried by said turn-table for supporting a piece of meat firmly in position thereon, and means for holding said turn-table releasably in adjusted position with respect to said ring.

FRANK L. CHERRY.